US012277424B2

(12) United States Patent
Nadiminti et al.

(10) Patent No.: US 12,277,424 B2
(45) Date of Patent: *Apr. 15, 2025

(54) CLOUD-BASED PROVISIONING OF UEFI-ENABLED SYSTEMS

(71) Applicant: Hewlett Packard Enterprise Development LP, Spring, TX (US)

(72) Inventors: Syama Sundararao Nadiminti, Karnataka (IN); Sriram Subramanian, Karnataka (IN); Sunil Malhotra, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,722

(22) Filed: Apr. 26, 2024

(65) Prior Publication Data

US 2024/0272913 A1 Aug. 15, 2024

Related U.S. Application Data

(63) Continuation of application No. 17/929,801, filed on Sep. 6, 2022, now Pat. No. 11,995,450.

(30) Foreign Application Priority Data

Jul. 15, 2022 (IN) .............................. 202241040569

(51) Int. Cl.
*G06F 9/4401* (2018.01)
*G06F 21/57* (2013.01)

(52) U.S. Cl.
CPC .......... *G06F 9/4416* (2013.01); *G06F 9/4406* (2013.01); *G06F 21/575* (2013.01)

(58) Field of Classification Search
CPC .... G06F 9/4416; G06F 9/4406; G06F 21/575; G06F 8/63
See application file for complete search history.

(56) References Cited

U.S. PATENT DOCUMENTS 9,250,887 B2 * 2/2016 Lucovsky ................. G06F 8/61
10,938,855 B1 3/2021 Waldie et al.
(Continued)

OTHER PUBLICATIONS

Cui, Neo; "Using HTTP Boot to Install an Operating System on Lenovo ThinkSystem servers"; Lenovo Press; May 14, 2019. (Year: 2019).

(Continued)

*Primary Examiner* — Glenn A. Auve
(74) *Attorney, Agent, or Firm* — Slater Matsil, LLP

(57) ABSTRACT

Examples of cloud-based provisioning of a computing system are disclosed. In an example, a baseboard management controller (BMC) of the computing system may be configured to establish a secure cloud provisioning connection between a cloud manager and the BMC. UEFI configuration may be received from the cloud manager over the secure cloud provisioning connection. A UEFI shell may be executed during a startup of the computing system initiated by the cloud manager. Based on the UEFI configuration, a provisioning proxy server communicatively coupled to a cloud repository may be identified. A startup script may be requested from the cloud repository over a network connection using a UEFI network stack. The startup script may download an image file via the provisioning proxy server from the cloud repository over the network connection and provision the computing system from the image file.

20 Claims, 7 Drawing Sheets

(56) References Cited

U.S. PATENT DOCUMENTS

| | | | |
|---|---|---|---|
| 11,995,450 B2* | 5/2024 | Nadiminti | G06F 9/4406 |
| 2014/0282815 A1 | 9/2014 | Cockrell et al. | |
| 2017/0228228 A1 | 8/2017 | Lin | |
| 2018/0136946 A1 | 5/2018 | El-Haj-Mahmoud et al. | |
| 2019/0339986 A1* | 11/2019 | Khatri | G06F 13/24 |
| 2020/0133686 A1 | 4/2020 | Lakshminarasimha et al. | |
| 2021/0124593 A1 | 4/2021 | Tseng | |

OTHER PUBLICATIONS

Github, "9pfsPkg: Network Boot from Bell Labs", available online at <https://retrage.github.io/2020/08/01/9pfspkg-en.html>, Aug. 1, 2020, 11 pages.

* cited by examiner

CLOUD-BASED PROVISIONING OF UEFI-ENABLED SYSTEMS

CROSS-REFERENCE TO RELATED APPLICATIONS

This application is a continuation application of and claims priority to application Ser. No. 17/929,801, filed on Sep. 6, 2022, the contents of which are hereby incorporated by reference in their entireties.

BACKGROUND

Unified extensible firmware interface (UEFI) defines an interface between an operating system (OS) and platform firmware in a computing system. UEFI may be used in pre-OS environments and may support remote provisioning, diagnostics, and repairs on computing systems.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
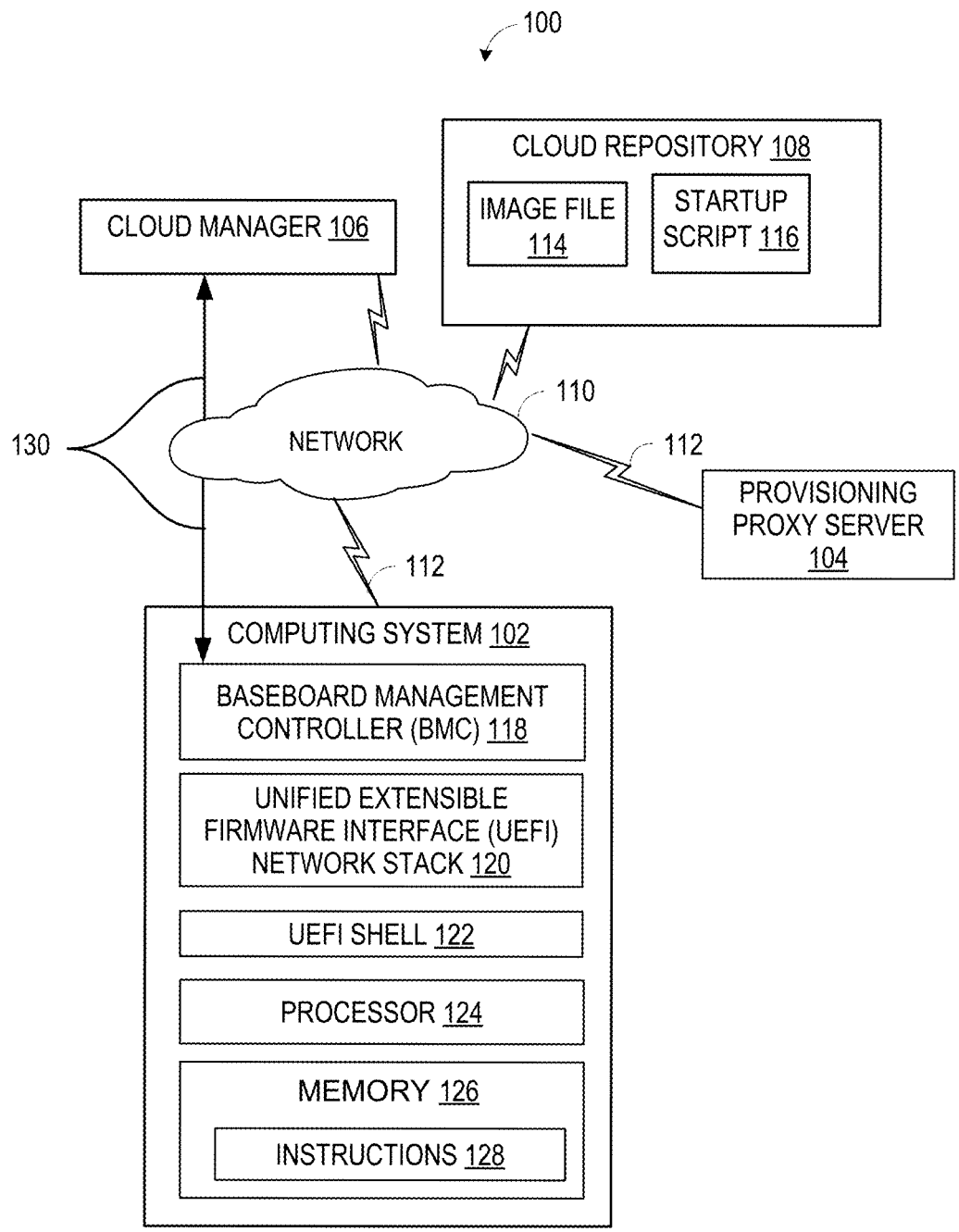
FIG. 1 illustrates a network environment for cloud-based provisioning of a computing system according to an example.

Generally, computing systems, such as servers may be provisioned and managed by management systems. In some examples, a management system may be deployed on a cloud infrastructure. The management system may provide a software-defined infrastructure for provisioning and life-cycle management of different software/firmware components in the computing systems. In some examples, provisioning a computing system may include installing an Operating System (OS), updating firmware, drivers, and software packages in the computing system, or performing any other preparatory measures for operating the computing system.

With UEFI enabled in a computing system, a built-in UEFI network stack and an embedded shell environment may be available for management of the computing system. In an example, the computing system may be on-premises, i.e., deployed in a customer's premises, and the management system may be implemented on a cloud infrastructure. Generally, image files of OS, firmware updates, or software packages used for provisioning may be stored in a repository hosted outside the customer's premises. The repositories may be hosted in a central database or in a cloud infrastructure which may be accessed by multiple computing systems requesting the image files. The repository storing the image files may be hosted on a Remote Device Access (RDA) cloud storage or a third-party cloud solution which may be accessed by multiple computing systems for provisioning.

A computing system located at the customer's premises is generally protected by different security policies which may be implemented in a firewall. To access the image files for provisioning, the computing system needs network connections to leave the firewall and access the repository. Further, since the computing system may be in a pre-OS environment, i.e., before an OS is installed in the computing system, a firmware interface between an OS and platform firmware, such as UEFI, may be used to establish such a network connection to access the repository. In addition, the image files for provisioning may have a size of a few Gigabytes (GBs). Thus, in order to download and install the image files, a fast and secure network connection may be necessary.

UEFI provides a UEFI network stack with networking capabilities to download and boot from images from a network location. The UEFI network stack may provide support for booting over network through a preboot execution environment (PXE). The UEFI network stack may also allow for a Hyper Text Transfer Protocol (HTTP) boot to startup a server from a Uniform Resource Locator (URL) over HTTP, thereby transferring large files, such as the kernel and root file systems from servers outside the local network of the customer. The UEFI network stack on the computing system may allow to HTTP boot a statically provisioned or Dynamic Host Configuration Protocol (DHCP)-discovered URL pointing to the image file via one of its network interfaces.

However, in some scenarios, the computing system may be prevented by the security policies implemented by the firewall in a customer premises to access and boot from an image file stored in a remote repository, such as a cloud repository. Standard implementations of UEFI do not have the capability to override or bypass the firewall to access the image file in the cloud repository. Thus, UEFI-implemented computing systems deployed in customer premises and protected by a firewall may not be able to boot from an image file over a network from a cloud repository.

Alternatively, other mechanisms to access and provision the computing system from the image files in the repository may be employed. In one example, the computing system may download the image file over a management network provided by a Baseboard Management Controller (BMC) of the computing system and store the image file in a local storage and provision the computing system from the locally stored image file. However, the management network provided by the BMC may have a limited bandwidth and the associated Network Interface Cards (NICs) may have limited capabilities. Hence, downloading the image file over the management network may be time consuming and may be subject to failures. Thus, an image file stored in a cloud repository may either be inaccessible to a computing system protected by a firewall or downloading the image file from the cloud repository may be time consuming and susceptible to failures if a management network is used.

The subject matter disclosed herein provides for mechanisms to provision a computing system from an image file stored in a cloud repository by downloading the image file via a provisioning proxy server over a network connection established using a UEFI network stack. The provisioning proxy server allows the computing system to access the image file in the cloud repository which may be otherwise inaccessible as the computing system may be protected by a firewall. In addition, the network connection based on the UEFI network stack used to download the image file is faster and more reliable as compared to a management network which may be otherwise used to download the image file.

According to examples of the present subject matter, the computing system may access the cloud repository via a provisioning proxy server over a network connection established using the UEFI network stack. The network connection via the provisioning proxy server may allow the computing system to access the cloud repository even though the computing system is protected by a firewall. With the mechanisms of the present subject matter, computing systems protected by corporate firewalls at customer sites may access the image file from the cloud repository, download the image file, and provision from the image file. Further, in the examples of the present subject matter, since the computing system may use a network connection established based on the UEFI network stack, the download of the image file for provisioning may be faster with reduced failures as compared to downloading the image file using a management network. This allows for efficient cloud provisioning and management of the computing system without relying on the management network which has limited bandwidth and capabilities.

In an example of the present subject matter, a secure cloud provisioning connection is established between a cloud manager and a BMC of the computing system during onboarding. "Onboarding" a computing system for cloud management can refer to performing tasks to allow the computing system to establish a connection with a cloud manager so that remote management of the computing system by the cloud manager can occur. The computing system may receive, from the cloud manager over the secure cloud provisioning connection, UEFI configuration. The UEFI configuration may include proxy settings associated with a provisioning proxy server communicatively coupled to a cloud repository. The computing system may execute a UEFI shell during its startup which may identify the provisioning proxy server based on the UEFI configuration. The UEFI shell may request via the provisioning proxy server a startup script from the cloud repository over a network connection using the UEFI network stack. The startup script may download the image file from the cloud repository over the network connection and provision the computing system from the image file.

Thus, the computing system may access the cloud repository using the network connection established based on the UEFI configuration via the provisioning proxy server, download the image file and provision from the image file. Use of the provisioning proxy server, may allow the computing system to bypass the firewall at the customer's premises while provisioning from the image file stored in the cloud repository. Further, since a wide range of high throughput network interface cards and links are available to UEFI, downloading the image file using the network connection based on the UEFI network stack is faster as compared to use of a management network. Thus, by enabling the computing system to interact with the provisioning proxy server to download the image file for provisioning, the computing system may be provisioned in a faster and reliable manner.

The following detailed description refers to the accompanying drawings. Wherever possible, the same reference numbers are used in the drawings and the following description to refer to the same or similar parts. While several embodiments of the present invention are described herein, modifications, adaptations, and other implementations of those embodiments are possible. Accordingly, the following detailed description does not limit the scope of the present invention. Instead, the proper scope of the present invention is defined by the appended claims.

FIG. 1 illustrates a network environment 100 for cloud-based provisioning of a computing system according to an example of the present subject matter. The network environment 100 includes a computing system 102 coupled to a provisioning proxy server 104, a cloud manager 106, and a cloud repository 108 via a network 110. The computing system 102 may be deployed at a customer site and may be protected by a firewall. A firewall is a network security solution that may monitor and filter incoming and outgoing network traffic based on an organization's established security policies. In an example, the firewall may block a list of web addresses from being accessed by the computing system 102. The customer site may include a geographical locality of an organization, such as a corporate office, an educational institution, a residential complex, a shopping complex, a healthcare facility, a government entity or any such enterprise. The customer site may have a datacenter to house the computing system 102 and associated components, such as power systems, communication systems, storage systems, and any other components necessary for operation of the computing system 102.

In some examples, the computing system 102 and the provisioning proxy server 104 may be disposed at remote locations from each other, for example, in different rooms, different buildings, different cities, or in different countries. Whereas, in certain other examples, both the computing system 102 and the provisioning proxy server 104 may be disposed in a close proximity of each other, for example, in a common IT infrastructure such as part of a local network.

The computing system 102 may include any electronic device capable of storing, processing, and/or communicating data with external devices over the network 110. Examples of the computing system may include at least one of the following: server computers, desktop computers, notebook computers, tablet computers, smartphones, game appliances, Internet-of-Things (IoT) devices, home appliances, storage devices, communication nodes, vehicles, vehicle controllers, or any other data processing device. Server computers may be blade servers or a rack-mounted servers, for example. Storage devices may be storage blades, for example. In an example, the computing system 102 may implement a pre-OS environment. The pre-OS environment refers to a collection of software and hardware resources that offer runtime services for firmware and interfaces between platform firmware and OS during startup of a computing system or across multiple computing systems within a datacenter, a cloud environment, a storage area network, a third-party co-location, or any other location (whether private or public). In an example, the computing system 102 may be a freshly deployed computing system 102 where no OS is installed. In some other examples, an OS, firmware, plugin, driver, or software package installed in the computing system 102 may be outdated due to new versions of the OS being launched.

The provisioning proxy server 104 may include systems, instructions, server applications, software, hardware, or a combination thereof, that may act as an intermediary between a system requesting a resource over the network 110 and a server providing that resource. In an example, the computing system 102 may be communicatively coupled with the provisioning proxy server 104 which may forward requests to and receive responses from a server, a repository, a cloud platform, a management solution, a web portal, or any other service or system connected over the network 110 for performing functions associated with provisioning of the computing system 102.

The cloud manager 106 can remotely manage computing systems over a network, such as a LAN, a WAN, a public network (e.g., the Internet), a private network, or any other network connection that allows the cloud manager 106 to access the computing systems. In an example, the cloud manager 106 may be hosted on a cloud platform, such as a private cloud, a public cloud, or a hybrid cloud. In some other examples, the cloud manager 106 may be hosted on a computing device, such as a virtual machine, a container, or a containerized application. Such virtual machine may utilize resources (e.g., processing power and/or storage capacity) of the host computing device. The container or containerized application may be located on a single host computing device or distributed across multiple computing devices.

In an example, the computing system 102 may be onboarded for being managed by the cloud manager 106. Onboarding the computing system 102 for cloud-based management can refer to performing tasks to allow the computing system to establish a connection with the cloud manager 106 so that remote management of the computing system 102 by the cloud manager 106 can occur. Once the computing system 102 is onboarded, the cloud manager may perform management tasks on the computing system 102. Examples of management tasks that can be performed with respect to the computing system 102 may include at least one of: monitoring the health of computing system 102, sending a program update to the computing system 102, sending control and configuration commands to the computing system 102 (e.g., to reset or reboot the computing system 102), and other related actions. Thus, by way of example, the cloud manager 106 may manage updates to OS, drivers, plugins, software packages, firmware, or a combination thereof, in the computing system 102.

The cloud repository 108 may refer to a storage location in the cloud where users or tenants can store data associated with their virtual machines, containers, or containerized applications. Tenants may utilize the cloud repository 108 as a target for backup and may access and restore data from the cloud repository 108. The cloud repository 108 may be a backup repository configured in the cloud infrastructure, such as a public cloud, a private cloud, or a hybrid cloud. The cloud repository 108 may be accessible to tenants authorized for access. Although in FIG. 1, the cloud manager 106 is shown separate from the cloud repository 108, in an example, the cloud manager 106 may be part of the cloud repository 108 and may use resources of the cloud repository 108. In an example, access to the cloud repository 108 may be blocked by a firewall implemented at the customer site where the computing system 102 is deployed. The firewall may block a web address of the cloud repository 108 from being accessed by the computing system 102.

The network 110 may be a medium that interconnects the computing system 102 with the provisioning proxy server 104, the cloud manager 106, and the cloud repository. Examples of the network 110 may include, but are not limited to, an Internet Protocol (IP) or non-IP-based local area network (LAN), wireless LAN (WLAN), metropolitan area network (MAN), wide area network (WAN), a cellular communication network, and the Internet. Communication over the network 110 may be performed in accordance with various communication protocols such as, but not limited to, Transmission Control Protocol and Internet Protocol (TCP/IP), User Datagram Protocol (UDP), IEEE 802.11, and/or cellular communication protocols over communication links 112. The communication links 112 may be enabled via a wired (e.g., copper, optical communication, etc.) or wireless (e.g., Wi-Fi®, cellular communication, satellite communication, Bluetooth, etc.) communication technologies. In some examples, the network 110 may be enabled via private communication links including, but not limited to, communication links established via Bluetooth, cellular communication, optical communication, radio frequency communication, and the like.

As shown in FIG. 1, the cloud repository 108 includes an image file 114 and a startup script 116. The image file 114 may include an executable file containing installable Operating System OS, a firmware, an interface, a driver, an API, a plugin, or other software packages that may be provisioned in the computing system 102 or across multiple computing systems within a datacenter, a cloud environment, a storage area network, a third-party co-location, or any other location (whether private or public). The startup script 116 is a file that contains commands to perform tasks for remote provisioning of the computing system 102 from the image file 114 stored in the cloud repository 108 based on UEFI configuration received by the computing system 102 from the cloud manager 106.

As depicted in FIG. 1, the computing system 102 may include a Baseboard management controller (BMC) 118, a UEFI network stack 120, a UEFI shell 122, a processor 124, and a memory 126. The BMC 118 may refer to a specialized service controller that monitors the physical state of a computing system, such as the computing system 102, using sensors and communicates with a remote management system (e.g., the cloud manager 106 that is remote from the computing system 102) through an independent "out-of-band" connection or management network. The BMC 118 has management capabilities to manage components of the computing system 102. Examples of management capabilities of the BMC 118 can include at least one of: power control to perform power management of the computing system 102 (such as to transition the computing system between different power consumption states in response to detected events), thermal monitoring and control of the computing system 102 (such as to monitor temperatures of the computing system and to control thermal management devices of the computing system), fan control of fans in the computing system 102, system health monitoring based on monitoring measurement data of various sensors of the computing system 102, remote access of the computing system 102 (to access the computing system over a network, for example), remote reboot of the computing system 102 (to trigger the computing system to reboot using a remote command), system setup and deployment of the computing system 102, system security to implement security procedures in the computing system 102, and related tasks.

In some examples, the BMC 118 can provide so-called "lights-out" functionality for computing systems. The lights out functionality may allow a user, such as a systems administrator, to perform management operations on the computing system even if an OS is not installed or not functional on the computing system. Moreover, in some examples, the BMC can run on auxiliary power provided by an auxiliary power supply (e.g., a battery); as a result, the computing system 102 does not have to be powered on to allow the BMC to perform the BMC's operations. The auxiliary power supply is separate from a main power supply that supplies powers to other components (e.g., the processor 124, the memory 126, etc.) of the computing system 102.

The UEFI network stack 120 may include a network interface controller hardware driver and a collection of network protocol stacks, drivers, or packages that support for booting a computing system over a network through a preboot execution environment (PXE), HTTP boot environment, or other methods of network boot. In some examples, the UEFI network stack may include at least one of a hypertext transfer protocol (HTTP) layer, a hypertext transfer protocol secure (HTTPS) layer, a file transfer protocol (FTP) layer, a trivial file transfer protocol (TFTP) layer, a file transfer protocol secure (FTPS) layer, a network file system (NFS), and a common internet file system (CIFS).

The UEFI shell 122 includes machine readable instructions executable by a command-line interpreter to launch EFI applications including shells, commands, scripts and bootloaders that may be used by an interface between a platform firmware and OS. Apart from that, the UEFI shell can also be used to obtain various other information about the computing system 102 or the firmware like memory map, modifying boot manager variables, running partitioning programs, loading UEFI drivers, or any other tasks involved in managing and provisioning the hardware and/or platform firmware of the computing system 102.

The memory 126 may be any electronic, magnetic, optical, or other physical transitory or non-transitory storage device that may store data and/or executable instructions. Therefore, the memory 126 may be, for example, Random Access Memory (RAM), an Electrically Erasable Programmable Read-Only Memory (EEPROM), a storage drive, a flash memory, a Compact Disc Read Only Memory (CD-ROM), and the like. As described in detail herein, the memory 126 may be encoded with executable instructions 128 for performing one or more methods, for example, methods described in FIGS. 3 and 4A-4B. Although shown separately in FIG. 1, a portion of the memory 126 may be included within the BMC 118 and may provide storage space to the BMC 118 for storing data processed by the BMC 118 or instructions executable by the BMC 118.

The processor 124 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices, or combinations thereof, capable of retrieving and executing instructions 128 stored in the memory 126. The processor 124 may fetch, decode, and execute the instructions 128 stored in the memory 126 to provision the computing system 102. As an alternative or in addition to executing the instructions 128, the processor 124 may include at least one integrated circuit (IC), control logic, electronic circuits, or combinations thereof that include a number of electronic components for performing the functionalities intended to be performed by the computing system 102.

In an example, a user may interact with an onboarding portal (not shown) of the cloud manager 106. A portal refers to a point of access of a device or service. In an example, the portal can be at a specified uniform resource locator (URL), a network address (e.g., an Internet Protocol (IP) address), or any other location in the network 110. In an example, the onboarding portal may be understood as a front-end of the cloud manager 106 which may provide one or more user interfaces for user interaction with the cloud manager 106.

The user may log into the onboarding portal using credentials, such as a username and password. Once the user has logged in, the cloud manager 106 may present a list of computing systems that are associated with a user account of the user. The user account may refer to an account of the user, for example, a business concern, an educational organization, a government agency, and an individual. The user may have registered with the user account to list computing systems that are eligible for cloud-based management by the cloud manager 106. The user may select, from the list, the computing system 102 to be onboarded for cloud-based management by the cloud manager 106 and thus onboarding of the computing system 102 may be initiated. A computing system associated with the user account may be identified based on device identification information which includes at least one of a serial number of the computing system, a product identifier of the computing system, a universally unique identifier (UUID), or any such identifier uniquely associated with the computing system. When the user selects the computing system 102 from the list, a device identification information of the computing system 102 may be received by the cloud manager 106 identifying the computing system 102 for onboarding.

During onboarding, of the computing system 102, in some examples, the BMC 118 may receive an indication that cloud-based management for the computing system 102 is to be enabled. In an example, the indication may be received in response to the user selecting the computer system 102 in the onboarding portal of the cloud manager 106. The indication may include the device identification information of the computing system 102.

In response to the indication, the BMC 118 may establish a secure cloud provisioning connection 130 between the cloud manager 106 and the BMC 118. The secure cloud provisioning connection 130 refers to a mutually authenticated network connection established between the cloud manager 106 and the BMC 118 such that the traffic exchanged is secure and trusted in both directions. The mutual authentication may be established by using protocols such as Transport Layer Security (TLS), mutual TLS, or other mutual authentication protocols based on private pair keys and certificates. In some examples, the secure cloud provisioning connection 130 includes a WebSocket connection over mTLS. In an example, the secure cloud provisioning connection 130 may be established over the network 110. In some examples, due to the likelihood of network disruptions between the BMC 118 and the cloud manager 106, techniques or mechanisms can be provided to keep the secure cloud provisioning connection 130 alive and/or to retry the establishment of the secure cloud provisioning connection 130 in case the connection is dropped.

Before serving any requests from the BMC 118 to the cloud manager 106 for purposes of performing cloud-based management, the BMC 118 expects a management registration request from the cloud manager 106. If the BMC 118 does not receive the management registration request within a timeout interval, the BMC 118 may tear down the secure cloud provisioning connection 130. The cloud manager 106 may send the management registration request to the BMC 118 via a Redfish Application Programming Interface (API). Redfish refers to a standard to provide a RESTful interface for the management of servers, storage, networking, converged infrastructure, and other computing systems. Tearing down the secure cloud provisioning connection 130 if the management registration request is not received by the BMC 118 within the timeout interval enhances security for the cloud-based management, since the BMC 118 uses receipt of the management registration request as further confirmation that the cloud manager 106 is legitimate. For further security, the BMC 118 can perform a scheduled teardown of the secure cloud provisioning connection 130, such as once every 24 hours or some other time period. Once the secure cloud provisioning connection 130 is torn down, the onboarding can be re-iterated.

The BMC 118 may receive, from the cloud manager 106, over the secure cloud provisioning connection 130, UEFI configuration. In an example, once the secure cloud provisioning connection 130 is established between the cloud manager 106 and the BMC 118, the cloud manager 106 may send the UEFI configuration. In another example, the UEFI configuration may be shared by the cloud manager 106 when cloud-based management is enabled for the computing system 102 during onboarding.

The UEFI configuration refers to information used to configure UEFI firmware in the computing system 102 for cloud-based provisioning from the cloud repository 108 via the provisioning proxy server 104. In an example, the UEFI configuration may include proxy settings of the provisioning proxy server 104, authentication information of the cloud repository 108, network locations of the image file 114 and the startup script 116, and network interface information.

The proxy settings of the provisioning proxy server 104 may include at least one of an Internet Protocol (IP) address, a domain name, a subnet information, and other information necessary to establish a connection with the provisioning proxy server 104. The proxy settings may be readable by the UEFI shell 122 and may be used by the UEFI shell 122 for accessing the provisioning proxy server 104.

The authentication information of the cloud repository 108 may include a certificate or certificate authority (CA) chain used to establish a network connection with the cloud repository 108. A CA chain (or chain of trust) is made up of a collection of certificates that start from a device's certificate and terminates with a root certificate. In the CA chain, each certificate is signed by the entity that is identified by the next certificate along the CA chain. If the device's certificate is to be trusted, its signature has to be traceable back to the CA of the root certificate. The computing system 102 may use the CA chain retrieved from the UEFI configuration to verify that the cloud repository 108 may be trusted.

The network locations of the image file 114 and the startup script 116 may include URLs pointing to the image file 114 and the startup script 116. By following the URLs the UEFI shell 122 may fetch the image file 114 and the startup script 116 from the cloud repository 108.

The network interface information refers to information identifying Network Interface Cards (NICs) of the computing system 102 available to the UEFI firmware for establishing a network connection with the cloud repository 108 over the network 110. In an example, the network interface information may include a list of NICs of the computing system 102 available to the UEFI firmware. In the list, the NICs may be denoted by at least one of a device identifier, a Universally Unique Identifier (UUID), a serial number, or any other such identifying information. At least one of the NICs in the list may be used for establishing a network connection with the cloud repository 108 over the network 110. In an example, the NICs may be high speed NICs of the computing system 102 and may support data rates ranging about 10 Gigabits per second.

Once the configuration information is successfully received by the BMC 118, the BMC 118 may send a configuration successful message to the cloud manager 106 over the secure cloud provisioning connection 130. The configuration successful message may indicate to the cloud manager 106 that UEFI firmware of the computing system 102 is configured for cloud-based provisioning. In some examples, the BMC 118 may receive the configuration information from the cloud manager 106 during onboarding even if the computing system 102 is in a power off or idle state. This is because, even if the computing system 102 is in a power off or idle state, the BMC 118 may draw its power from an auxiliary power source, such as an in-built battery, and may performs its operations. In some other examples, a computing system, such as a server, freshly deployed in a customer site may be in a pre-OS environment. Such a computing system may be powered on for the first time during onboarding and may receive the UEFI configuration.

In an example, in response to receiving the configuration successful message, the cloud manager 106 may trigger a startup of the computing system 102. The trigger may refer to a signal or command sent by the cloud manager 106 to the computing system 102 which may cause the computing system 102 to start up. Startup refers to the process of powering up and preparing the computing system, operating system, hardware, or software for operation and may include booting up firmware or an interface, such as UEFI, between the platform firmware and the OS. Startup of the computing system 102 may also be called bootup or boot. In other examples, the trigger may be generated based on a user interaction via a portal of the cloud manager 106.

Thus, the BMC 118 may receive the trigger form the cloud manager 106 to startup the computing system 102. On receiving the trigger the BMC 118 may startup the computing system and transfer control to the processor 124. In an example, the instructions 128 when executed by the processor 124 may cause the processor 124 to execute the UEFI shell 122. On execution, the UEFI shell 122 may launch the UEFI boot mode. The UEFI boot mode may refer to an execution environment for starting up a computing system based on UEFI functionalities enabled in the computing system. UEFI boot mode includes the startup process used by UEFI firmware. In the UEFI boot mode, different components of UEFI, such as EFI system partition, applications, device drivers, UEFI network stack 120, and graphic features may be loaded.

Further, the instructions 128 when executed by the processor 124 may cause the processor 124 to identify, based on the UEFI configuration, the provisioning proxy server 104. In an example, the processor 124 may retrieve the proxy settings of the provisioning proxy server 104 from the UEFI configuration. For example, the processor 124 may obtain the IP address, subnet information, port address, and other information to establish a network connection with the provisioning proxy server 104. In an example, the network connection may be established between the computing system 102 and the provisioning proxy server 104 over the network 110 using TCP and HTTPS supported by the UEFI network stack 120. Once the network connection is established between the provisioning proxy server 104 and the computing system 102, the provisioning proxy server 104 may act as an intermediary to send and receive data on behalf of the computing system 102.

In an example, the provisioning proxy server 104 may be outside a firewall protecting the computing system 102. The firewall may block a list of web address from being accessed by the computing system 102 and the list may include a web address of the cloud repository 108. However, as the provisioning proxy server 104 has a different web address, it may not be blocked by the firewall and thus may be accessible to the computing system 102. Further, the provisioning proxy server 104 may also be able to access the cloud repository 108 as it is outside the firewall. Thus, once the network connection between the provisioning proxy server 104 and the computing system 102 is established, exchange of data between the computing system 102 and the cloud repository 108 occurs via the provisioning proxy server 104.

Further, the instructions 128, when executed by the processor 124 cause the processor 124 to request the startup script 116 from the cloud repository 108 via the provisioning proxy server and based on the UEFI configuration. In an example, the UEFI shell 122 may obtain, from the UEFI configuration, authentication information of the cloud repository 108. The UEFI shell 122 may retrieve a certificate or CA chain based on which it may verify whether the cloud repository 108 is a trusted source. In response to determining that the cloud repository 108 is a trusted source, the UEFI shell 122 may establish a network connection with the cloud repository 108 using the UEFI network stack 120. The network connection may be a HTTPS based network connection supported by the UEFI network stack 120. As explained earlier, the NICs of the computing system 102 used for the network connection may also be identified based on the UEFI configuration. Since these NICs may be high speed NICs with data rates of about 10 Gigabits per second, the network connection between the computing system 102 and the cloud repository 108 may support high data rates and thus allow faster download of the startup script 116 and the image file 114 consequently enabling faster cloud-based provisioning.

In an example, the UEFI shell 122 may retrieve a URL of the startup script 116 from the UEFI configuration. The UEFI shell 122 may send the request for the startup script 116 directed to the URL hosted in the cloud repository 108 over the network connection. The UEFI shell 122 may fetch the startup script 116 from the cloud repository 108 based on the URL, download the startup script 116, and store it on the memory 126. In an example, requesting the startup script 116 and downloading the startup script 116 is performed via the provisioning proxy server 104, which allows the computing system 102 to exchange data with the cloud repository 108 overriding a firewall that may be protecting the computing system 102.

The processor 124 may execute the startup script 116 to download the image file 114 from the cloud repository 108 over the network connection via the provisioning proxy server 104 at step 218. The startup script 116 may retrieve the authentication information of the cloud repository 108 from the UEFI configuration. Using the certificates/CA chain in the authentication information, the startup script 116 may verify that the cloud repository 108 is a trusted source. After verifying the cloud repository 108, the startup script 116 may access the URL of the image file 114 in the cloud repository 108. The startup script 116 may download the image file 114 over the network connection and store the image file 114 in the memory 126. Since, the network connection used for downloading the image file 114 from the cloud repository 108 may use high-speed NICs of the computing system 102, as mentioned earlier, downloading of the image file 114 may be faster.

The image file 114 may be stored as a bootable file in the memory 126. A bootable file refers to a file that have been configured to run when the computing system starts up. The startup script 116 may launch an installer application and run the image file 114 to provision the computing system 102. Provisioning the computing system 102 may include installing/updating an OS, updating firmware, drivers, and software packages in the computing system 102 on execution of the image file 114, or performing any other preparatory measures for operating the computing system 102. Thus, the computing system 102 may be provisioned from the cloud repository 108 via the provisioning proxy server 104 over the network connection established using the UEFI network stack 120.

Figure 2A:
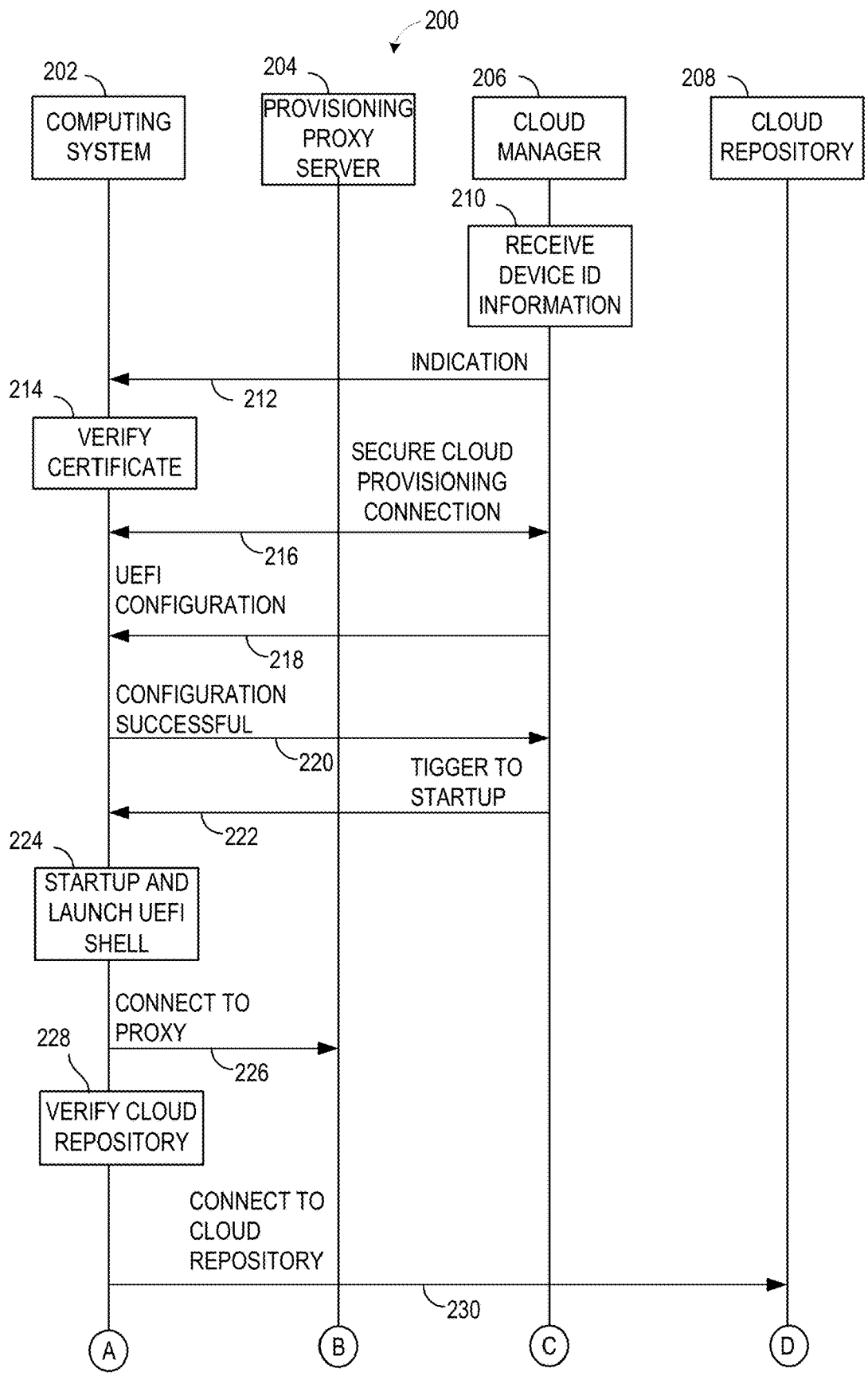
FIGS. 2A and 2B illustrate a flow diagram of a cloud-based provisioning process, according to an example.
Figure 2B:
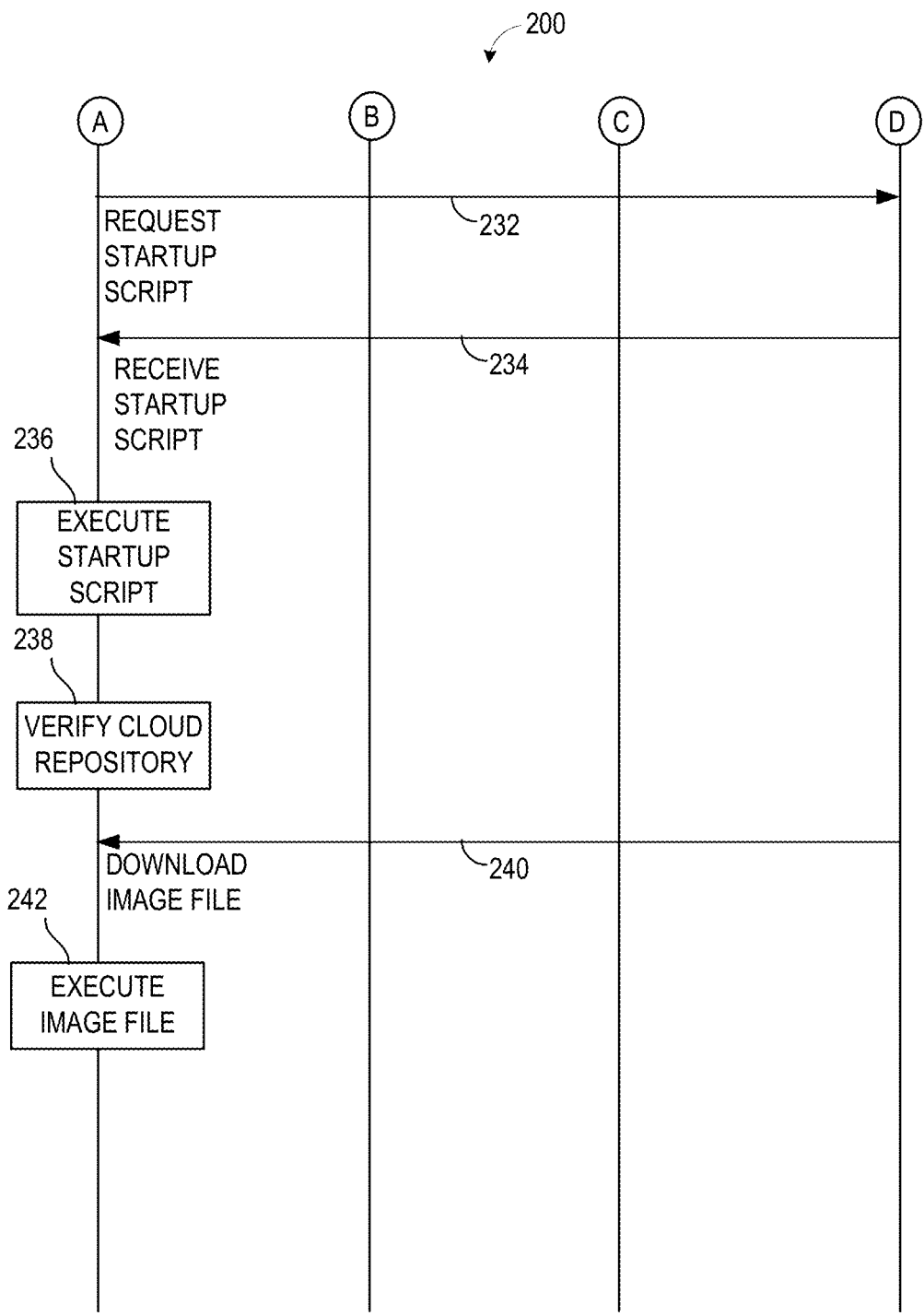

FIGS. 2A and 2B illustrate a flow diagram of a cloud-based provisioning process 200, according to an example. The cloud-based provisioning process 200 includes steps 210 to 242. The cloud-based provisioning process 200 involves tasks performed by a computing system 202, provisioning proxy server 204, cloud manager 206, and cloud repository 208. The computing system 202 may be similar to the computing system 102 of FIG. 1, the provisioning proxy server 204 may be similar to the provisioning proxy server 104 of FIG. 1, the cloud manager 206 may be similar to the cloud manager 106 of FIG. 1, and the cloud repository 208 may be similar to the cloud repository 108 of FIG. 1.

As shown in FIG. 2A, the cloud manager 206 may receive, at step 210, device identification information of a computing system for which cloud-based management is to be enabled. In an example, the cloud manager 206 may receive the device identification information of the computing system 202. The cloud manager 206 may receive the device identification information in response to a user selecting the computing system 202 to be onboarded for cloud-based management by the cloud manager 206, from a list of computing systems associated with a user account of the user.

The cloud manager 206 may send, at step 212, an indication to the computing system 202 that cloud-based management for the computing system 202 is to be enabled. In an example, the indication may include device identification information of the computing system 202. The cloud manager 106 may send the indication in response to the user selecting the computer system 202 for cloud-based management.

In response to the indication, the computing system 202 may verify, at step 214, certificates or CA chain associated with the cloud manager 206. Based on the verification, the computing system 202 may determine whether the cloud manager 206 is legitimate. In some examples, the certificates or CA chain may be stored in a certificate store (not shown) of the computing system 202. The certificate store of the computing system may include a collection of security certificates or CA chains and may be a part of persistent memory of the computing system 202. A CA chain (or chain of trust) is made up of a collection of certificates that start from a device's certificate and terminates with a root certificate. In the CA chain, each certificate is signed by the entity that is identified by the next certificate along the CA chain. If the device's certificate is to be trusted, its signature has to be traceable back to the CA of the root certificate. The computing system 102 may use the CA chain retrieved from the certificate store to verify that the cloud manager 206 is legitimate.

After successfully verifying the cloud manager 206, the computing system 202 may establish, at step 216, a secure cloud provisioning connection with the cloud manager 206. In some examples, if the verification is unsuccessful, the computing system 202 may cease attempts to establish a connection with the cloud manager 206. This may also cause onboarding of the computing system 202 to pause. The secure cloud provisioning connection may be similar to the secure cloud provisioning connection 130 of FIG. 1.

The computing system 202 may receive, at step 218, from the cloud manager 206 over the secure cloud provisioning connection, UEFI configuration. The UEFI configuration may include proxy settings of the provisioning proxy server 204, authentication information of the cloud repository 208, network locations of an image file and a startup script, and network interface information, and any other information used to configure UEFI firmware in the computing system 202 for cloud-based provisioning from the cloud repository 208 via the provisioning proxy server 204.

Once the configuration information is successfully received by the computing system 202, the computing system 202 may send, at step 220, a configuration successful message to the cloud manager 206 over the secure cloud provisioning connection. In some examples, the computing system 202 may receive the configuration information from the cloud manager 206 during onboarding even if the computing system 202 is in a power off or idle state. This is because, the steps 210 to 220 may be performed by a BMC of the computing system 202. Even if the computing system 202 is in a power off or idle state, the BMC may draw its power from an auxiliary power source, such as an in-built battery and may performs its operations. In some other examples, a computing system, such as a server, freshly deployed in a customer site may be in a pre-OS environment. Such a computing system may be started up for the first time during onboarding and may performs the steps 210 to 220. In some examples, if the configuration information is not successfully received by the computing system 202 from the cloud manager 206, after a certain time of onboarding, the computing system 202 may send a message to the cloud manager 206 requesting for the configuration information.

In response to receiving the configuration successful message, the cloud manager 206 may send, at step 222, a trigger to startup the computing system 202. The trigger may refer to a packet or command sent by the cloud manager 206 to the computing system 202 which may cause the computing system 202 to start up. Startup refers to the process of powering up and preparing the computing system, operating system, hardware, or software for operation and may include booting up firmware or an interface, such as UEFI, between the platform firmware and the OS. Startup of the computing system 202 may also be called bootup or boot. In some examples, the trigger may be generated based on a user interaction via a portal of the cloud manager 206.

On receiving the trigger, the computing system 202 may startup and launch an UEFI shell, at step 224, in the UEFI boot mode. The UEFI shell may retrieve the proxy settings of the provisioning proxy server 204 from the UEFI configuration received at step 218. The UEFI shell may use the proxy settings to establish a network connection with the provisioning proxy server 204. The computing system 202 may use the UEFI shell and the proxy settings to connect, at step 226, to the provisioning proxy server 204. In an example, the computing system 202 may connect with the provisioning proxy server 204 over TCP and HTTPS supported by an UEFI network stack, one example of which is the UEFI network stack 120 of FIG. 1.

The computing system 202 may verify, at step 228, legitimacy of the cloud repository 208 using authentication information of the cloud repository 208 extracted from the UEFI configuration. In response to determining that the cloud repository 208 is legitimate, the computing system 202 may connect, at step 230, to the cloud repository 208. In an example, the computing system 202 may connect to the cloud repository 208 via an HTTPS based network connection supported by the UEFI network stack. In another example, in response to determining that the cloud repository 208 is not secure or not trusted, the computing system 202 may use other authentication techniques, such as token authentication, API key authentication, or other secure shell (SSH) authentication methods for local or cloud-based authentication of the cloud repository 208. In an example, if the verification of the cloud repository 208 fails, the computing system 202 may stop the process 200 and generate a notification for a network administrator indicating failure of authentication of the cloud repository 208. In an example, the notification may be rendered via a user interface on a portal of the cloud manager 206.

Referring to FIG. 2B, the computing system 202 sends, at step 232, a request for the startup script to the cloud repository 208 via the provisioning proxy server 204. In an example, although not shown in FIG. 2B, the computing system 202 may send the request for the startup script to the provisioning proxy server 204 which may forward the request to the cloud repository 208 thereby acting as an intermediary between the computing system 202 and the cloud repository 208. In response to the request, the computing system 202 receives, at step 234, the startup script from cloud repository 208.

The computing system 202 may execute, at step 236, the startup script The startup script may retrieve the authentication information of the cloud repository 208 from the UEFI configuration. Based on the authentication information, the computing system 202 verifies, at step 238, that the cloud repository 208 is legitimate. In an example, if the verification of the cloud repository 208 at step 234 fails, the computing system 202 may stop the process 200 and generate a notification for a network administrator indicating failure of authentication of the cloud repository 208. In an example, the notification may be rendered via a user interface on a portal of the cloud manager 206.

After verifying the cloud repository 208, the startup script may access the URL of the image file in the cloud repository 208. The computing system 202 executing the startup script may download, at step 240, the image file from the cloud repository 208. The image file may be stored as an executable file in a memory of the computing system 202. The computing system 202 may execute, at step 242, the image file to provision the computing system 202.

Figure 3:
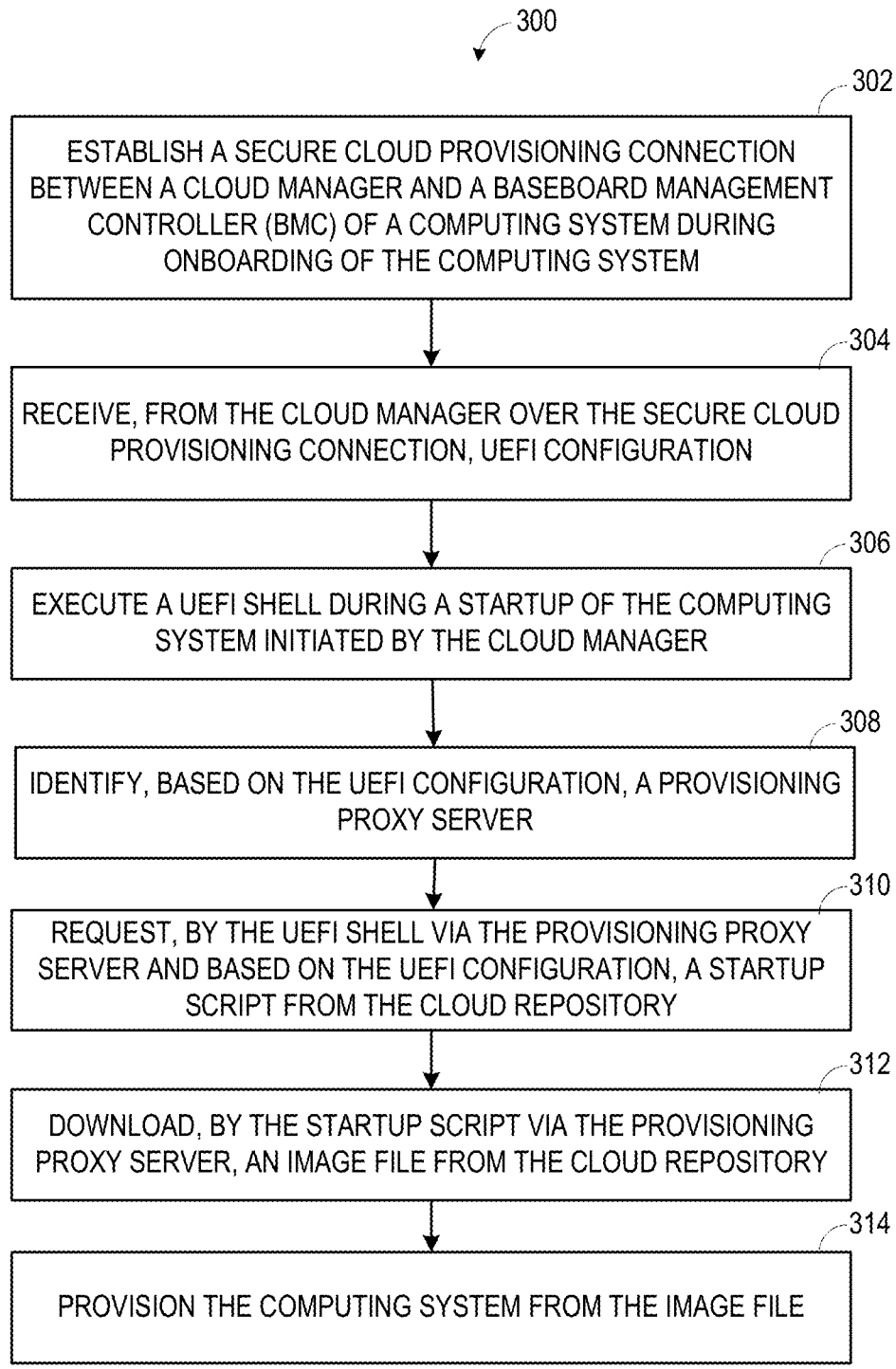
FIG. 3 illustrates a flowchart of a method for cloud-based provisioning of a computing system, according to an example.

FIG. 3 illustrates a flowchart of a method 300 for cloud-based provisioning of a computing system, according to an example. In an example, the method 400 may be performed by a computing system, such as the computing system 102 of FIG. 1. Terminology used herein is consistent with earlier description. Components described are examples of components described in earlier figures.

At block 302, the method 300 begins with establishing a secure cloud provisioning connection between a cloud manager and a BMC of the computing system during onboarding of the computing system. In an example, the cloud manager may be located in a cloud repository. In an example, establishing the secure provisioning connection may refer to connecting with the cloud manager over the secure provisioning connection. In one example, the secure cloud provisioning connection may be the secure cloud provisioning connection 130 of FIG. 1. In some other examples, the secure cloud provisioning connection includes a WebSocket connection over mTLS.

At block 304, the method 300 continues with receiving, from the cloud manager over the secure cloud provisioning connection, UEFI configuration. The UEFI configuration may include proxy settings of a provisioning proxy server, network interface configuration, authentication information of the cloud repository. The UEFI configuration refers to information used to configure UEFI firmware in the computing system for cloud-based provisioning from the cloud repository via the provisioning proxy server. The UEFI configuration may be stored in the cloud manager. In some examples, the UEFI configuration may be created or modified by a network administrator via an onboarding portal of the cloud manager.

At block 306, the method 300 continues with executing a UEFI shell during a startup of the computing system initiated by the cloud manager. In an example, the cloud manager may trigger the computing system to startup in a UEFI boot mode and execute the UEFI shell to load functionalities of the UEFI firmware. [In some examples, executing the UEFI shell refers to running the components of the shell to initiate an HTTP boot of the computing system in the UEFI boot mode. One example of the UEFI shell is the UEFI shell 122 shown in FIG. 1.

At block 308, the method 300 continues with identifying, based on the UEFI configuration, a provisioning proxy server. In an example, the proxy settings of the provisioning proxy server may identify the provisioning proxy server in the network. In some examples, identifying the provisioning proxy server refers to configuring the UEFI firmware to access the provisioning proxy server based on the proxy settings. In an example, protocol definitions in the UEFI network stack may allow UEFI firmware to access the provisioning proxy server based on the proxy settings. One example of the provisioning proxy server is the provisioning proxy server 104 shown in FIG. 1.

At block 310, the method 300 continues with requesting, by the UEFI shell via the provisioning proxy server and based on the UEFI configuration, a startup script from the cloud repository over a network connection using the UEFI network stack. The network connection may be established based on HTTPS supported by a UEFI network stack in the computing system. In some examples, the UEFI shell may send a request to download the startup script to the provisioning proxy server. The provisioning proxy server may forward that request to the cloud repository. The request may include an URL of the startup script obtained from the UEFI configuration. Using the URL, the UEFI shell may search for the startup script in the cloud repository and download the startup script in the computing system. The downloaded startup script may be stored in a memory of the computing system. One example of the startup script is the startup script 116 shown in FIG. 1.

At block 312, the method 300 continues with downloading, by the startup script via the provisioning proxy server, an image file from the cloud repository over the network connection. In an example, downloading the image file refers to creating a copy of the image file from the cloud repository in the computing system. The copy of the image file may be a duplicate of the image file in the cloud repository. The startup script may search for the image file using its URL from the UEFI configurations and download the same. One example of the image file is the image file 114 shown in FIG. 1.

At block 314, the method 300 continues with provisioning the computing system from the image file. Provisioning the computing system may include installing an OS, updating firmware, drivers, and software packages in the computing system on execution of the image file or performing any other preparatory measures for operating the computing system.

Figure 4A:
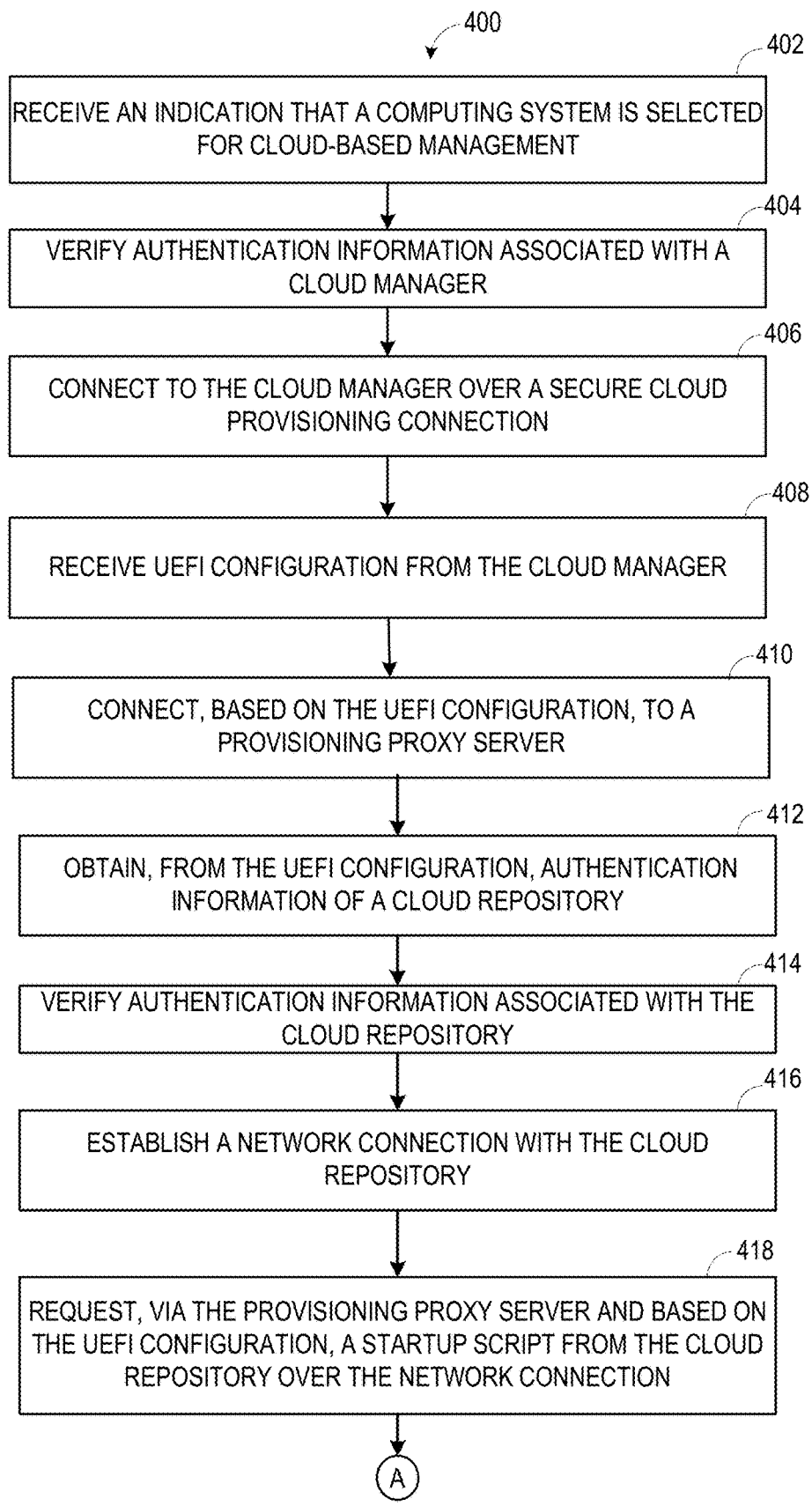
FIGS. 4A and 4B illustrate a flowchart of a method for cloud-based provisioning of a computing system, according to another example.
Figure 4B:
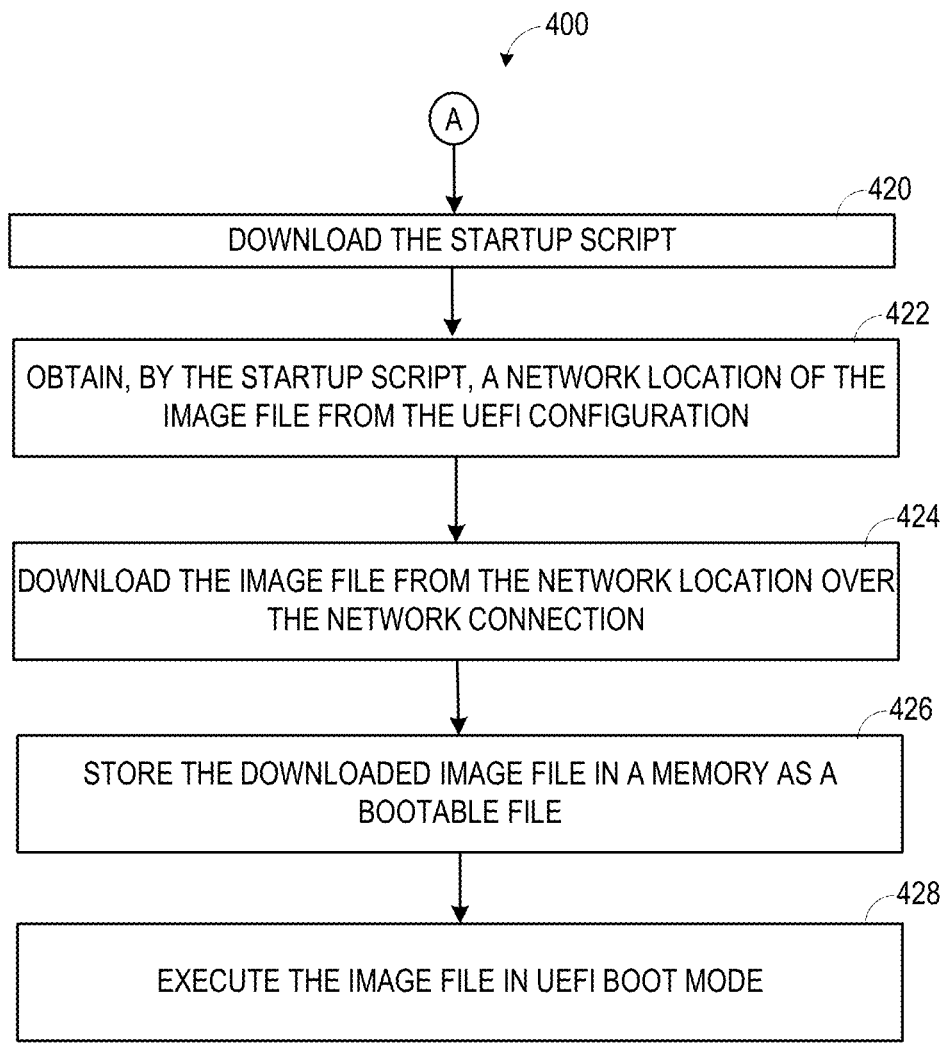

FIGS. 4A and 4B illustrate a flowchart depicting a method 400 for cloud-based provisioning of a computing system, according to another example. In an example, the method 400 may be performed by a computing system, such as the computing system 102 of FIG. 1. Terminology used herein is consistent with earlier description. Components described are examples of components described in earlier figures.

At block 402, the method 400 begins with receiving an indication that a computing system is selected for cloud-based management. In an example, the indication may be received from a cloud manager. The cloud manager may receive a user input selecting a computing system from a list of computing systems for cloud-based management. The indication may include device identification information of the computing system selected for cloud-based management.

At block 404, the method 400 continues with verifying authentication information associated with a cloud manager. In an example, certificates or CA chain associated with the cloud manager may be checked to determine whether the cloud manager is legitimate. In some examples, the certificates or CA chain may be stored in a certificate store of the computing system. The certificate store of the computing system may include a collection of security certificates or CA chains and may be a part of persistent memory of the computing system 202. A CA chain (or chain of trust) is made up of a collection of certificates that start from a device's certificate and terminates with a root certificate. In the CA chain, each certificate is signed by the entity that is identified by the next certificate along the CA chain. If the device's certificate is to be trusted, its signature has to be traceable back to the CA of the root certificate. The computing system 102 may use the CA chain retrieved from the certificate store to verify that the cloud manager 206 is legitimate.

At block 406, the method 400 continues with connecting with the cloud manager over a secure cloud provisioning connection. In an example, the secure cloud provisioning connection may be established using TLS, mTLS, or other mutual authentication protocols. The computing system may interact with the cloud manager over a RESTful API interface, such as a Redfish API.

At block 408, the method 400 continues with receiving UEFI configuration from the cloud manager. The UEFI configuration refers to information used to configure UEFI firmware in the computing system for cloud-based provisioning from the cloud repository via the provisioning proxy server. In an example, the UEFI configuration may include proxy settings of a provisioning proxy server, authentication information of the cloud repository, network locations of an image file and startup script, and network interface information. Thus, the UEFI configuration may be stored in the computing system.

In an example, the cloud manager may trigger the computing system to startup in a UEFI boot mode and execute the UEFI shell to load functionalities of the UEFI firmware. On starting up the computing system in the UEFI boot mode, at block 410, the method 400 continues with connecting, based on the UEFI configuration, to the provisioning proxy server. In an example, the computing system may connect to the provisioning proxy server using the proxy settings in the UEFI configuration.

At block 412, the method 400 continues with obtaining, from the UEFI configuration, authentication information of the cloud repository. The authentication information may include certificates or CA chains associated with the cloud repository. In an example, a certificate store of the computing system may include a collection of security certificates or CA chains which may be a part of persistent memory of the computing system.

At block 414, the method 400 continues with verifying authentication information associated with the cloud repository. In an example, the certificates or CA chains associated with the cloud repository are checked for legitimacy. A CA chain (or chain of trust) is made up of a collection of certificates that start from a device's certificate and terminates with a root certificate. Each certificate may be verified to be linked to a certifying authority trusted by the next device in the chain.

At block 416, the method 400 continues with establishing a network connection with the cloud repository. The network connection may be based on HTTPS supported by a UEFI network stack. In an example, establishing the network connection may refer to connecting to the cloud repository via the provisioning proxy server over an HTTPS connection. The HTTPS connection may be supported by the UEFI network stack of the computing system.

At block 418, the method 400 continues with requesting, via the provisioning proxy server and based on the UEFI configuration, a startup script from the cloud repository over the network connection. In an example, a URL of the startup script may be retrieved from the UEFI configuration which may be accessed over the network connection.

At block 420, the method 400 continues with downloading the startup script. In some examples, downloading the startup script refers to copying the startup script in a persistent memory of the computing system.

The startup script may be executed to obtain a network location of an image file from the UEFI configuration at block 422. The network location of the image file may be a URL pointing to the image file in the cloud repository. In an example, the startup script may fetch the URL of the image file from the UEFI configuration. In an example, the URL of the image file may be a network address or a web address of the cloud repository. One example of the cloud repository is the cloud repository 108 shown in FIG. 1.

At block 424, the method 400 continues with downloading the image file from the network location over the network connection. In some examples, downloading the image file refers to copying the image file in a persistent memory of the computing system. In an example, after the download the image file may be available in a local memory of the computing system.

At block 426, the method 400 continues with storing the downloaded image file in the memory as a bootable file. A bootable file refers to a file that have been configured to run when the computing system starts up. The startup script may launch an installer application and run the image file to provision the computing system.

Thus, at block 428, the method 400 continues with executing the image file in the UEFI boot mode to provision the computing system from the image file. In an example, the image file may include files for installing an OS in the computing system. Execution of such an image file during startup of the computing system in the UEFI boot mode causes the OS to be installed in the computing system. Installation of the OS by executing the downloaded image file may be referred to as OS provisioning. Once OS provisioning in the computing system is complete, application software, end-user programs, and other utilities may be run by the computing system. In other examples, components of UEFI firmware or other firmware or software packages may be updated by executing the image file during startup. In some examples, after provisioning of the computing system is complete, the computing system may reboot to load software, hardware, and firmware components necessary for its operations.

Figure 5:
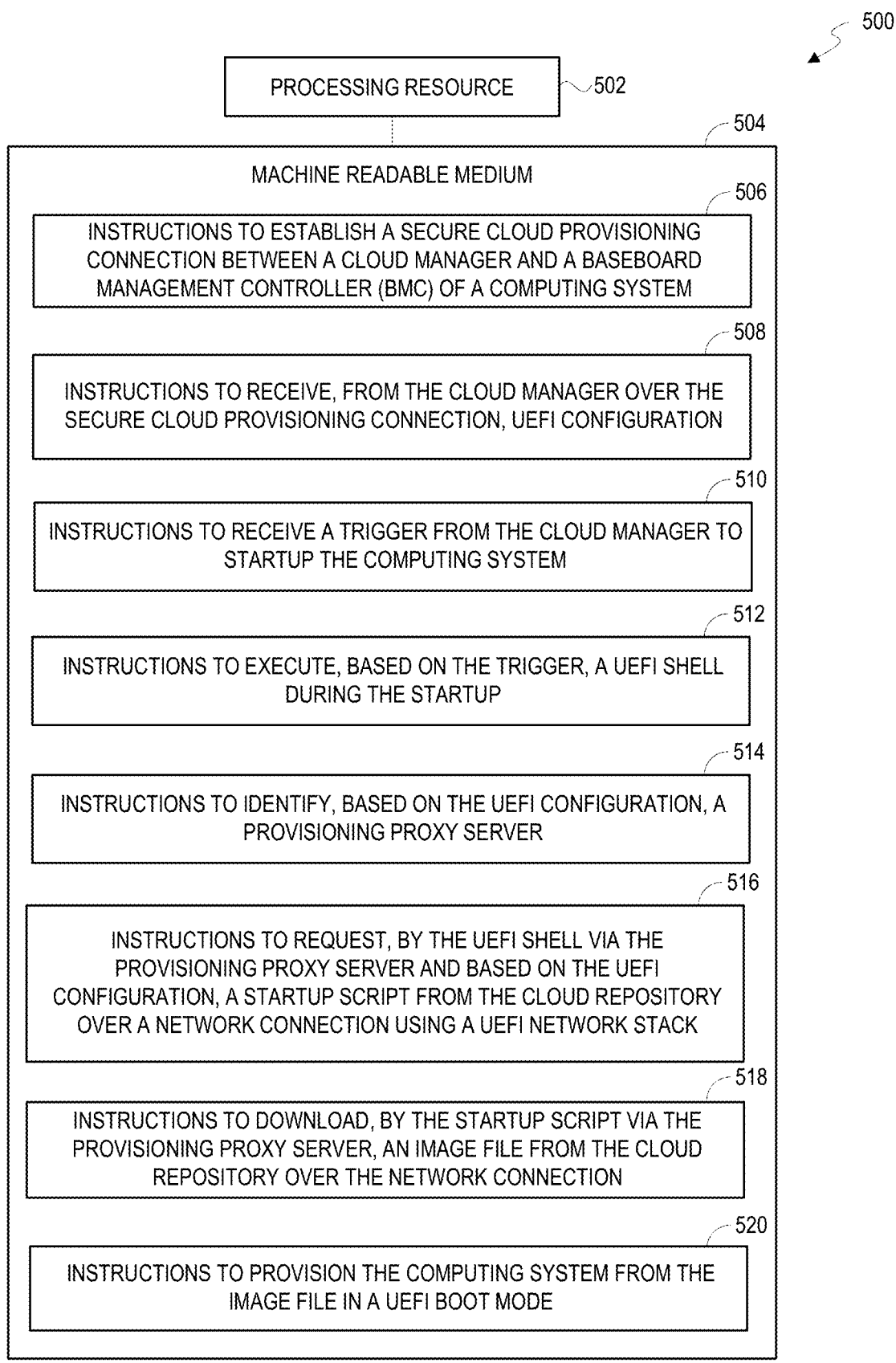
FIG. 5 is a block diagram depicting a processing resource and a machine-readable medium encoded with example instructions for cloud-based provisioning of a computing system, according to another example.

FIG. 5 depicts a block diagram 500 of a processing resource 502 and a machine-readable medium 504 encoded with instructions for cloud-based provisioning of a computing system, according to an example. The machine-readable medium 504 may be non-transitory and is alternatively referred to as a non-transitory machine-readable medium 504. In some examples, the machine-readable medium 504 may be accessed by the processing resource 502. In some examples, the processing resource 502 may represent one example of the processor 124 of the computing system 102 of FIG. 1. Further, the machine-readable medium 504 may represent one example of the memory 126 of the computing system 102.

The machine-readable medium 504 may be any electronic, magnetic, optical, or other physical storage device that may store data and/or executable instructions. Therefore, the machine-readable medium 504 may be, for example, RAM, an EEPROM, a storage drive, a flash memory, a CD-ROM, and the like. As described in detail herein, the machine-readable medium 504 may be encoded with executable instructions 506-520 for performing one or more methods, for example, methods described in FIGS. 3, 4A and 4B. The instructions 506-520 may represent one example of the instructions 128 of FIG. 1.

The processing resource 502 may be a physical device, for example, one or more CPU, one or more semiconductor-based microprocessor, one or more GPU, ASIC, FPGA, other hardware devices capable of retrieving and executing of the instructions 506-520 stored in the machine-readable medium 504, or combinations thereof. In some examples, the processing resource 502 may fetch, decode, and execute the instructions 506-520 stored in the machine-readable medium 504 for cloud-based provisioning of a computing system. In certain examples, as an alternative or in addition to retrieving and executing the instructions 506-520, the processing resource 502 may include at least one IC, other control logic, other electronic circuits, or combinations thereof that include a number of electronic components for performing the functionalities intended to be performed by the computing system.

The instructions 506, when executed, may cause the processing resource 502 to establish a secure cloud provisioning connection between a cloud manager and a Baseboard Management Controller (BMC) of a computing system during onboarding of the computing system for cloud-based management by the cloud manager. In an example, the cloud manager may perform remote management tasks for the computing system once the computing system is onboarded.

Further, the instructions 508, when executed, may cause the processing resource 502 to receive, from the cloud manager over the secure cloud provisioning connection, UEFI configuration. In an example, the processing resource 502 may send a request to the cloud manager for the UEFI configuration. The cloud manager may send the UEFI configuration in response to the request. In another example, the cloud manager may send the UEFI configuration at the time of onboarding of the computing system for cloud-based management.

Moreover, in some examples, the instructions 510, when executed, may cause the processing resource 502 to receive a trigger from the cloud manager to startup the computing system. For example, the trigger may be in the form of a RESTful API command from the cloud manager to the computing system.

Furthermore, in some examples, the instructions 512, when executed, may cause the processing resource 502 to execute, based on the trigger, a UEFI shell during the startup. The trigger may refer to a signal or command sent by the cloud manager to the computing system which may cause the computing system to start up. Startup refers to the process of powering up and preparing the computing system, operating system, hardware, or software for operation and may include booting up firmware or an interface, such as UEFI, between the platform firmware and the OS. Startup of the computing system may also be called bootup or boot. In other examples, the trigger may be generated based on a user interaction via a portal of the cloud manager. The UEFI firmware may run the UEFI shell during the startup.

In some examples, the computing system may startup and run the UEFI shell to load the UEFI functionalities, such as a UEFI network stack. In some examples, the instructions 514, when executed by the processing resource 502, may cause the processing resource 502 to identify, based on the UEFI configuration, a provisioning proxy server.

Further, in some examples, the instructions 516, when executed by the processing resource 502, may cause the processing resource 502 to request, by the UEFI shell via the provisioning proxy server and based on the UEFI configuration, a startup script from the cloud repository over a network connection using the UEFI network stack.

Furthermore, the instructions 518, when executed by the processing resource 502, may cause the processing resource 502 to download, by the startup script via the provisioning proxy server, an image file from the cloud repository over the network connection.

Moreover, in some examples, the instructions 520, when executed by the processing resource 502, may cause the processing resource 502 to provision the computing system from the image file in a UEFI boot mode. In some examples, the computing system may execute the image file to install an OS.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

The invention claimed is:

1. A computing system, comprising:
a controller configured to receive, from a cloud manager over a secure connection, unified extensible firmware interface (UEFI) configuration;
one or more processors; and
one or more non-transitory computer-readable storage media storing programming for execution by the one or more processors, the programming comprising instructions to:
identify, based on the UEFI configuration, a provisioning proxy server;
obtain, via the provisioning proxy server and based on the UEFI configuration, a startup script from a repository over a network connection;
download, by the startup script via the provisioning proxy server, an image file from the repository over the network connection; and
provision the computing system from the image file.

2. The computing system of claim 1, wherein the computing system further comprises:
a main power supply; and
an auxiliary power supply that is separate from the main power supply; and
the controller is configured to:
be powered by an auxiliary power supply when the computing system is in a power off state or an idle state; and
perform at least one of establishing the secure connection with the cloud manager or receiving the UEFI configuration while the computing system is in the power off state or the idle state and the controller is powered by the auxiliary power supply.

3. The computing system of claim 1, wherein the controller is further configured to:
obtain one or more certificates associated with the cloud manager;
attempt to verify, based on the one or more certificates, whether the cloud manager is legitimate; and
establish, after successfully verifying, based on the one or more certificates, that the cloud manager is legitimate, the secure connection with the cloud manager.

4. The computing system of claim 1, further comprising instructions to:
obtain, from the UEFI configuration, authentication information of the repository; and
establish, based on the authentication information, the network connection with the repository.

5. The computing system of claim 4, wherein:
the authentication information comprises one or more certificates associated with the repository;
the computing system further comprises;
instructions to verify whether the repository is a trusted source based on the one or more certificates; and
instructions to establish the network connection with the repository after successfully verifying that the repository is the trusted source.

6. The computing system of claim 5, wherein:
the authentication information comprises a Certificate Authority (CA) chain that comprises the one or more certificates; and
the instructions to attempt to verify, based on the one or more certificates, whether the repository is a trusted source comprise instructions to verify each of the one or more certificates of the CA chain.

7. The computing system of claim 1, wherein the image file comprises an image for at least one of installing or updating at least one of an operating system (OS), a firmware, an interface, a driver, an application programming interface (API), or a plugin, of the computing system.

8. The computing system of claim 1, further comprising instructions to request the startup script from the repository via the provisioning proxy server using transport layer security (TLS).

9. The computing system of claim 1, comprising receiving the UEFI configuration from the cloud manager in a pre-operating system (OS) environment of the computing system.

10. The computing system of claim 1, wherein the image file is executed in UEFI boot mode during provisioning of the computing system.

11. A computer-implemented method, comprising:
  receiving, by a computing system via a secure connection with a cloud manager, unified extensible firmware interface (UEFI) configuration;
  identifying, based on the UEFI configuration, a provisioning proxy server;
  obtaining, via the provisioning proxy server and based on the UEFI configuration, a startup script from a repository over a network connection;
  downloading, by the startup script via the provisioning proxy server, an image file from the repository over the network connection; and
  provisioning the computing system using the image file.

12. The computer-implemented method of claim 11, wherein:
  the secure connection is between a Baseboard Management Controller (BMC) of the computing system and the cloud manager; and
  the method further comprises performing at least one of establishing the secure connection with the cloud manager or receiving the UEFI configuration while the computing system is in a power off state or an idle state and the BMC is powered by an auxiliary power supply, the auxiliary power supply being separate from a main power supply of the computing system.

13. The computer-implemented method of claim 11, further comprising:
  obtaining one or more certificates associated with the cloud manager;
  attempting to verify, based on the one or more certificates, whether the cloud manager is legitimate; and
  establishing, after successfully verifying, based on the one or more certificates, that the cloud manager is legitimate, the secure connection with the cloud manager.

14. The computer-implemented method of claim 11, further comprising:
  obtaining, from the UEFI configuration, authentication information of the repository; and
  establishing, based on the authentication information, the network connection with the repository.

15. The computer-implemented method of claim 14, wherein:
  the authentication information comprises one or more certificates associated with the repository;
  the method further comprises:
    attempting to verify whether the repository is a trusted source based on the one or more certificates; and
    establishing the network connection with the repository after successfully verifying that the repository is the trusted source.

16. The computer-implemented method of claim 15, wherein:
  the authentication information comprises a Certificate Authority (CA) chain that comprises the one or more certificates; and
  attempting to verify, based on the one or more certificates, whether the repository is a trusted source comprises verifying each of the one or more certificates of the CA chain.

17. The computer-implemented method of claim 11, further comprising:
  obtaining a network location of the image file from the UEFI configuration;
  downloading the image file from the network location over the network connection; and
  storing the downloaded image file in a memory of the computing system as a bootable file.

18. The computer-implemented method of claim 11, wherein the image file comprises an image for at least one of installing or updating at least one of an operating system (OS), a firmware, an interface, a driver, an application programming interface (API), or a plugin of the computing system.

19. The computer-implemented method of claim 11, comprising receiving the UEFI configuration from the cloud manager in a pre-operating system (OS) environment of the computing system.

20. One or more non-transitory computer-readable storage media storing programming for execution by one or more processors, the programming comprising instructions to:
  receive, by a computing system via a secure connection with a cloud manager, unified extensible firmware interface (UEFI) configuration;
  identify, based on the UEFI configuration, a provisioning proxy server;
  obtain, via the provisioning proxy server and based on the UEFI configuration, a startup script from a repository over a network connection;
  download, by the startup script via the provisioning proxy server, an image file from the repository over the network connection; and
  provision the computing system using the image file.

* * * * *